United States Patent
Talin et al.

(10) Patent No.: US 6,656,339 B2
(45) Date of Patent: Dec. 2, 2003

(54) METHOD OF FORMING A NANO-SUPPORTED CATALYST ON A SUBSTRATE FOR NANOTUBE GROWTH

(75) Inventors: Albert A. Talin, Scottsdale, AZ (US); Bernard F. Coll, Fountain Hills, AZ (US); Kenneth A. Dean, Phoenix, AZ (US); Matthew Stainer, Goleta, CA (US)

(73) Assignee: Motorola, Inc., Schaumburg, IL (US)

( * ) Notice: Subject to any disclaimer, the term of this patent is extended or adjusted under 35 U.S.C. 154(b) by 150 days.

(21) Appl. No.: 09/942,496

(22) Filed: Aug. 29, 2001

(65) Prior Publication Data
US 2003/0042147 A1 Mar. 6, 2003

(51) Int. Cl.$^7$ ............................................... C25D 15/00
(52) U.S. Cl. .................. 205/109; 205/157; 205/159; 205/162; 205/191; 205/192; 205/193; 205/333; 427/64; 427/69; 427/249.1; 427/249.11; 423/414
(58) Field of Search ................. 205/157, 159, 205/162, 191, 192, 193, 333, 109; 427/64, 69, 249.11, 249.1; 423/414

(56) References Cited

U.S. PATENT DOCUMENTS

| | | | |
|---|---|---|---|
| 6,059,627 A | 5/2000 | Dean et al. | |
| 6,129,901 A | 10/2000 | Moskovits et al. | |
| 6,146,227 A | * 11/2000 | Mancevski | 445/24 |
| 6,346,182 B1 | * 2/2002 | Bradley | 205/89 |
| 2003/0013280 A1 | * 1/2003 | Yamanaka | 438/487 |

OTHER PUBLICATIONS

Chen et al., "Formatio of bamboo-shaped carbon filaments and dependence of their morphology on catalyst composition and reaction conditions", Dept. of Catalysis Science and Technology, Tianjun University, China. 2001, no month avail.

Davydov et al., "Field emitters based on porous aluminum oxide templates," Journal of Appl. Physics, vol.. 86, No. 7, Oct. 1, 1999, pp. 3983–3987.

Database WPI, Section Ch, Week 200124, Derwent Publications, Ltd. London, AN 2002–232933, XP–002239217, Oct. 5, 2000, abstract.

* cited by examiner

*Primary Examiner*—Roy King
*Assistant Examiner*—Wesley A. Nicolas
(74) *Attorney, Agent, or Firm*—William E. Koch

(57) ABSTRACT

Methods of forming a nano-supported catalyst on a substrate and at least one carbon nanotube on the substrate are comprised of configuring a substrate with an electrode (102), immersing the substrate with the electrode into a solvent containing a first metal salt and a second metal salt (104) and applying a bias voltage to the electrode such that a nano-supported catalyst is at least partly formed with the first metal salt and the second metal salt on the substrate at the electrode (106). In addition, the method of forming at least one carbon nanotube is comprised of conducting a chemical reaction process such as catalytic decomposition, pyrolysis, chemical vapor deposition, or hot filament chemical vapor deposition o grow at least one nanotube on the surface of the nano-supported catalyst (108).

19 Claims, 2 Drawing Sheets

METHOD OF FORMING A NANO-SUPPORTED CATALYST ON A SUBSTRATE FOR NANOTUBE GROWTH

FIELD OF THE INVENTION

The present invention generally relates to a method of forming a nano-supported catalyst on a substrate, and more particularly to a method of forming a nano-supported catalyst on a substrate for nanotube growth.

BACKGROUND OF THE INVENTION

A nanotube, and more specifically a carbon nanotube, is known to be useful for providing electron emission in a vacuum device, such as a field emission display. The use of a carbon nanotube as an electron emitter has reduced the cost of vacuum devices, including the cost of a field emission display. The reduction in cost of the field emission display has been obtained with the carbon nanotube replacing other electron emitters (e.g., a Spindt tip), which generally have higher fabrication costs as compared to a carbon nanotube based electron emitter.

The manufacturing costs for vacuum devices (e.g., a field emission display) that use a carbon nanotube can be further reduced if the carbon nanotube is grown on the field emission substrate from a catalytic surface using chemical vapor deposition or other film deposition techniques. Nanotube growth can be done as a last deposition process preventing the degradation of the electron emitter properties by other device processing techniques or steps (e.g., wet processes). To further reduce costs for vacuum devices, it is also desirable to construct the field emission substrate from materials such as borosilicate glass or sodalime glass. However, borosilicate glass and sodalime glass cannot generally tolerate temperatures above about sixty hundred and fifty degrees Celsius (650° C.) and the tolerance of borosilicate glass and sodalime glass is further reduced if the borosilicate glass or sodalime glass is subjected to temperatures above sixty hundred and fifty degrees Celsius (650° C.) for an extended period of time or forces are applied to the borosilicate glass or sodalime glass at such temperatures.

In view of the foregoing, it is desirable to provide a nano-supported catalyst on a field emission substrate for carbon nanotube growth that allows such a carbon nanotube to be grown on the field emission substrate that has a deformation temperature below about six hundred and fifty degrees Celsius (650° C.). Furthermore, additional desirable features will become apparent to one skilled in the art from the drawings, foregoing background of the invention and following detailed description of a preferred exemplary embodiment, and appended claims.

BRIEF DESCRIPTION OF THE DRAWINGS

The present invention will hereinafter be described in conjunction with the appended drawing figures, wherein like numerals denote like elements, and.

DETAILED DESCRIPTION OF PREFERRED EXEMPLARY EMBODIMENTS

The following detailed description of preferred embodiments is merely exemplary in nature and is not intended to limit the invention or the application and uses of the invention. Furthermore, there is no intention to be bound by any theory presented in the preceding background of the invention or this detailed description of preferred exemplary embodiments.

Figure 1:
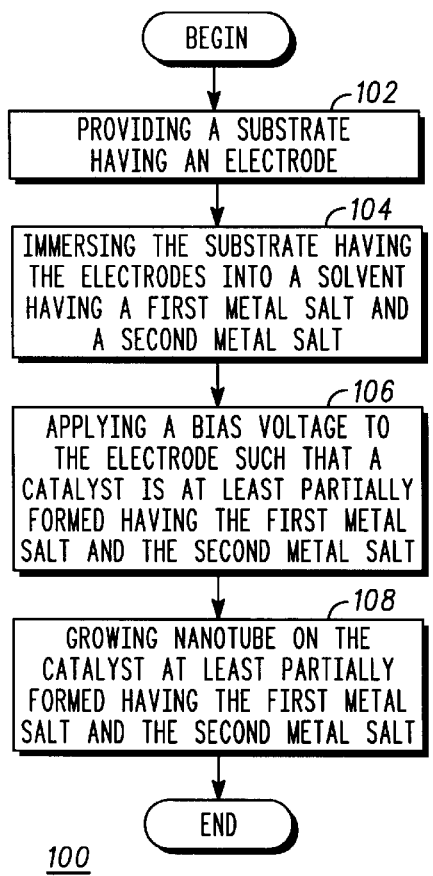
FIG. 1 is a flowchart of a first method for forming a nano-supported catalyst according to a preferred exemplary embodiment of the present invention.

Referring to FIG. 1, a first method 100 is illustrated for forming a nano-supported catalyst on a substrate that can be used to grow nanotubes and preferably carbon nanotubes according to a preferred exemplary embodiment of the present invention. The method 100 begins with providing a substrate having an electrode 102. The substrate is preferably borosilicate glass or sodalime glass, however any number of substrates can be used according to the present invention. For example, the substrate can be other glasses, silicon, semiconductors, carbon, ceramics, metals and composite materials.

The electrode is preferably located on the substrate at the location in which the nano-supported catalyst is to be grown. The electrode can be any number of materials and can be configured on the substrate using any number of techniques. For example, the electrode can be a semiconductor or conductor, preferably a metal such as copper, that is formed on the substrate with any number of semiconductor or conductor deposition techniques (e.g., photolithographic patterning and deposition). Alternatively, the first method 100 and the second method 300 subsequently described in this detailed description of preferred exemplary embodiments with reference to FIG. 3 can begin with a substrate with a conductive surface layer having an unexposed portion that is covered by a photoresist and an exposed portion that is absent of the photoresist. The photoresist can be deposited and selectively exposed and removed using photolithographic patterning and etching techniques, with the exposed portion of the substrate configured as the electrode.

After the substrate having an electrode is provided 102 according to the present invention, the substrate having the electrode is immersed into a solvent having a first metal salt and a second metal salt 104. Any number of soluble metal salts can be used for the first metal salt and the second metal salt as long as the first metal salt and the second metal salt react at the electrode to form an insoluble metal, metal hydroxide, or metal oxide. For example, the first metal salt can be aluminum nitrate, magnesium nitrate, calcium nitrate or combination thereof, and the second metal salt can be a metal nitrate or sulfate containing iron, nickel, cobalt, ruthenium, rhodium, palladium, rhenium, osmium, iridium, platinum, or a combination thereof. The first and second metal salts are at least partially dissolved in any number of solvents, including, but not limited to, water, alcohol or a combination of water and alcohol (e.g., methanol, ethanol, and isopropyl alcohol). Additional compounds such as particles, surfactants, etc. can also be placed into the solvent.

The immersion of the substrate having the electrode into the solvent having the first metal salt and the second metal salt 104 can be accomplished with numerous immersion techniques, including, but not limited to, spin immersion, spray immersion, dip coating immersion, ink jet spraying followed by electrolysis, etc. Once the substrate having the electrode is immersed into the solvent having the first metal salt and the second metal salt 104, the method 100 continues with the application of a bias voltage to the electrode such that a nano-supported catalyst is at least partially formed of the first metal and the second metal salt 106.

Figure 2:
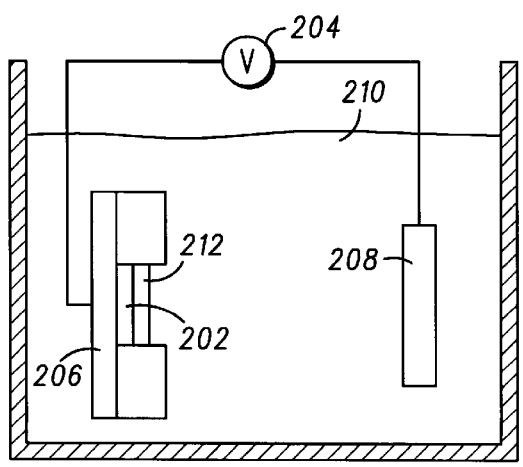
FIG. 2 is an apparatus for forming a nano-supported catalyst according to a preferred exemplary embodiment of the present invention.

Referring to FIG. 2, the application of the bias voltage to the electrode 202 is preferably applied with a biasing source 204 connected to the electrode 202 of the substrate 206 and a counter electrode 208 immersed in the solvent 210 such that the nano-supported catalyst 212 is at least partially formed of the first metal salt (not shown) and the second metal salt (not shown) in the solvent 210. Alternatively, the counter electrode 208 can be located on the substrate 206 (not shown). For example, a negative bias of less than about fifty (50) volts, preferably between about two (2) to five (2) volts, is applied for about sixty (60) seconds with the biasing source 204 between the electrode 202 on the substrate 206 of borosilicate glass and the counter electrode 208, which is immersed in the solvent 210 of isopropyl alcohol with $1 \times 10^{-2}$M of salt aluminum nitrate ($Al(NO_3)_3$) (i.e., the first metal salt) and $1 \times 10^{-3}$M of ferric nitrate ($Fe(NO_3)_3$) (i.e., the second metal salt) with the electrode 202 on the substrate 206, such that a nano-supported catalyst 212 of iron-aluminum oxide hydrate is formed on the electrode 202 of the substrate 206. As can be appreciated by one of ordinary skill in the art, the resulting iron-aluminum oxide hydrate is comprised of an insulating metal oxide support that is at least partially derived from the first metal salt and a conducting metal oxide that is at least partially derived from the second metal salt. During catalytic activity, the oxygen can be removed using conventional techniques (e.g., heating) from the conducting metal oxide that is at least partially derived from the second metal salt resulting in an active catalytic pure metal. However, as can also be appreciated by one of ordinary skill in the art, numerous variations of this example are available according to the present invention. (See Appendix 1 for additional examples that should not be construed as limiting embodiments of the present invention.)

Referring to FIG. 1, after the nano-supported catalyst is at least partially formed with the application of a bias voltage 106, the method 100 continues with the growing of nanotubes, preferably carbon nanotubes, on the nano-supported catalyst with a chemical reaction process such as catalytic decomposition, pyrolysis, or chemical vapor deposition (CVD), and preferably hot filament chemical vapor deposition (HFCVD) 108. The techniques required for conducting these processes are known in the art. The nanotube growth temperature of the substrate during the chemical reaction process is a function of the substrate. For example, the nanotube growth temperature of a substrate of borosilicate glass is preferably less than about six hundred and fifty degrees Celsius (650° C.), more preferably less than about six hundred degrees Celsius (600° C.) and most preferably less than about six hundred degrees Celsius and greater than about five hundred degrees Celsius (500° C.). As one skilled in the art can appreciate, the nanotube growth temperature of other suitable substrates may be higher than about six hundred and fifty degrees Celsius (650° C.).

In a preferred embodiment, HFCVD is used to grow carbon nanotubes at the location of the nano-supported catalyst. HFCVD begins with introducing the substrate having the nano-supported catalyst into a CVD growth chamber. A refractory metal filament (e.g., tungsten, platinum, rhenium, tantalum) is heated to a temperature above about nineteen hundred degrees Celsius (1900° C.) in vacuum or as molecular hydrogen is flowed over the refractory metal filament. Carbon containing gases such as methane, acetylene, and xylene can also be flowed over the filament to provide a carbon source for nanotube growth.

More specifically, the substrate with the nano-supported catalyst is placed into a thermally conducting substrate holder (e.g., graphite) that is placed in a predefined location with respect to the hot filament (e.g., below the hot filament). The substrate holder can be a heater or it can be thermally connected to a heater. This configuration of the substrate with the nano-supported catalyst and the hot filament allows the substrate's temperature (i.e., the nanotube growth temperature) to be independently controlled from the hot filament temperature. During the growth of at least one carbon nanotube and more preferably multiple carbon nanotubes on the nano-supported catalyst of the substrate, the distance between the hot filament and the substrate is controlled to provide a temperature of the substrate (i.e., the nanotube growth temperature). For example, a distance of about one-half to about two centimeters (0.5 to 2 cm) between the hot filament and the substrate is provided for a nanotube growth (or substrate) temperature ranging from about three hundred and fifty degrees Celsius (350° C.) to about six hundred degrees Celsius (600° C.).

Once the desired nanotube growth temperature is provided on the substrate, a carbon source is introduced into the CVD growth chamber. Any hydrocarbon or carbon-compound (e.g., methane, carbon monoxide, etc.) can be used as the carbon source. For example, a gas mixture of hydrogen ($H_2$) and methane ($CH_4$) can be used as the hydrocarbon source, with a flow rate of one hundred (100) standard cubic centimeters per minute (sccm) for hydrogen and forty (40) sccm for methane. The methane is diluted by the hydrogen ($H_2$) and thermally disassociated and activated with the hot filament. The ratio of the methane ($CH_4$) to hydrogen ($H_2$) is preferably maintained with the range of twenty percent (20%) to forty percent (40%) and the pressure of the CVD growth chamber is maintained at about twenty (20) to fifty (50) torr. The simultaneous production of atomic hydrogen during hydrocarbon pyrolysis enhances the deposition of the carbon nanotubes and the growth of the carbon nanotubes is discontinued when the length of the carbon nanotubes is a desired length for a particular application (e.g., the tips of the carbon nanotubes have grown to level of the gate aperture).

Figure 3:
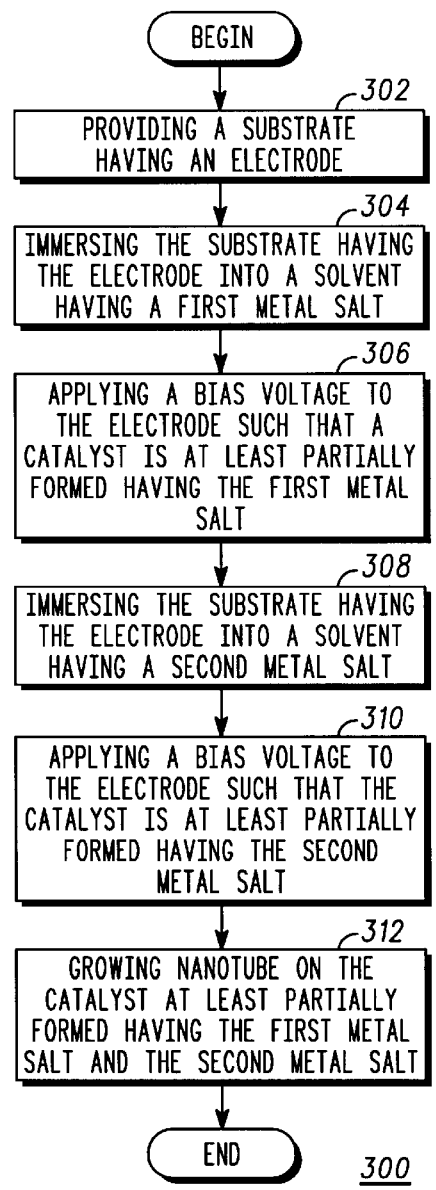
FIG. 3 is a flowchart of a second method of forming a nano-supported catalyst according to a preferred exemplary embodiment of the present invention.

Referring to FIG. 3, a second method 300 is illustrated according to a preferred exemplary embodiment of the present invention for forming a nano-supported catalyst on a substrate that has many desirable features, including nanotube and more preferably carbon nanotube growth. The second method 300 can use numerous materials, combinations of materials, solvents, metal salts and concentrations of metal salts in the solvent for the substrate, electrode, solvent (s), first and second metal salts and concentrations thereof, respectively, including the materials, combinations of materials, solvents, metal salts and metal salt concentrations in the solvent that were previously discussed with reference to the first method 100 of FIG. 1.

The second method 300 begins as the first method begins with providing a substrate and an electrode 302. Thereafter, the substrate with the electrode is immersed into a first solvent containing a first metal salt 304. While the substrate with the electrode is immersed in the first solvent containing the first metal salt 304, a bias voltage is applied from a counter electrode to the electrode such that a nano-supported catalyst is at least partly formed with the first metal salt on the substrate at the electrode 306.

After the nano-supported catalyst is at least partly formed with the first metal salt on the substrate at the electrode 306, the substrate with the electrode is removed from the solvent containing the first metal salt and immersed into a second solvent containing a second metal salt 308. A bias voltage is applied from a counter electrode to the electrode such that the nano-supported catalyst is partly formed with the second metal salt 310. The substrate with the electrode with the nano-supported catalyst is then dried and ready for introduction into a CVD growth chamber for growing at least one and more preferably multiple nanotubes on the nano-supported catalyst formed with the first metal salt and the second metal salt 312 as previously discussed with reference to the method 100 of FIG. 1.

Unlike other conventional catalysts formed by electro-deposition, which generally have active catalytic particles with at least one dimension (i.e., diameter, width, length, or depth) that is greater than one micron (1 $\mu$m), the nano-supported catalyst formed according to the present invention has active catalytic particles with at least one dimension that is about one-tenth of a nanometer (0.1 nm) to about five hundred nanometers (500 nm), preferably less than fifty nanometers (50 nm) in size, more preferably less than about ten nanometers (10 nm), even more preferably less than about three nanometers (3 nm), and most preferably less than about one nanometer (1 nm), derived from the second metal salt (e.g., iron, nickel, cobalt, ruthenium, rhodium, palladium, rhenium, osmium, iridium, or platinum, or a combination thereof) and supported by the metal oxide support derived from the first metal salt (e.g., alumina, magnesium oxide, calcium oxide). Changing the composition ratio between the second metal salt and the remaining materials deposited to form the nano-supported catalyst structure can control the density of the active catalytic particles. The nano-support provided by the metal oxide support maintains the nano-scale dimensions of the active catalytic particles through the useful temperature of the catalytic process including the chemical process described above for growing nanotubes (e.g., HFCVD) and prevent the active catalytic particles from coalescing during such process. This nano-support renders the particle size independent of the nano-supported catalyst layer thickness and temperature cycle. Furthermore, the metal oxide support can prevent diffusion of poisons to the nano-supported catalyst and can enhance its chemical reactivity. Due to its nano-supported structure, the nano-supported catalyst has a high surface area and a high surface area to volume ratio.

The nano-supported catalyst provided on the substrate with the first method 100 and the second method 300 of the present invention allows nanotubes and more preferably carbon nanotubes to be selectively and sparsely grown on a micro-pattern (i.e., sub-pixel or quantum dots). The present invention provides single wall and multi-wall nanotubes having a substantially uniform structure. The nanotubes formed according to the present invention preferably have a diameter less than about twenty nanometers (20 nm) and more preferably a diameter that is greater than about one nanometer (1 nm) and less than about three nanometers (3 nm). In addition, the nanotubes formed according to the present invention preferably have an aspect ratio defined as height of the nanotube to the width of the nanotube that is about one hundred and forty (140) to about four thousand five hundred (4,500) and more preferably from about one thousand (1,000) to three thousand five hundred (3,500) with a substantially perpendicular orientation with respect to the surface of the substrate. The preferred carbon nanotubes that are configured as electron emitters for a vacuum device such as a field emission display provide a triode geometry from about one-tenth of a micron (0.10 $\mu$m) to about twenty-five microns (25 $\mu$m), a switching voltage that is less than about eighty (80) volts with a cathode current in the range of greater than greater than about one and a half milliamps per square centimeter (1.5 mA/cm$^2$) and a gate spacing less than about twenty-five microns (25 $\mu$m). Furthermore, the preferred nanotubes have significant dispersion in that they are spaced between about twenty nanometers (20 nm) to two thousand nanometers (2,000 nm) apart and grown by the nano-supported catalyst that has active catalytic particles that are preferably less than about ten nanometers (10 nm) in size, more preferably less than about three nanometer (3 nm) in size, and most preferably about one nanometer (1 nm) in size.

The nano-supported catalyst formed according to the present invention can also be used for numerous other applications such as a resistive material in a FED (e.g., ballast resistors) and a catalyst used in catalytic converters, chemical synthesis, fuel cells, pollution control devices, or the production of scanning probe microscope tips, etc.

From the foregoing description, it should be appreciated that a nano-supported catalyst on a substrate for nanotube growth and methods of forming a nano-supported catalyst on a substrate for nanotube growth are provided which present significant benefits that are described in the background of the invention and the detailed description of preferred exemplary embodiments, and also would be apparent to one skilled in the art. Furthermore, while preferred exemplary embodiments have been presented in the foregoing description of preferred exemplary embodiments, it should be appreciated that a vast number of variations in the embodiments exist. Lastly, it should be appreciated that these embodiments are preferred exemplary embodiments only, and are not intended to limit the scope, applicability, or configuration of the invention in any way. Rather, the foregoing detailed description provides those skilled in the art with a convenient road map for implementing a preferred exemplary embodiment of the invention. It being understood that various changes may be made in the function and arrangement of elements described in the exemplary preferred embodiments without departing from the spirit and scope of the invention as set forth in the appended claims.

UTILITY PATENT
CR00-037

APPENDIX 1

EXAMPLE I

1. Immerse a borosilicate glass with a copper (Cu) metal pattern (i.e., substrate with an electrode) into a solution of $1 \times 10^{-2}$M $Al(NO_3)_3$ in isopropyl alcohol (IPA) and apply a negative twenty volt (-20V) bias to the copper metal pattern while keeping a counter electrode, which can be constructed out of stainless steel, at ground for a duration of one (1) minute. The desired chemical reactions involved in this step are:

$Al(NO_3)_3 \rightarrow Al(NO_3)^{2+} + NO_3^-$ occurring in the solution;

$Al(NO_3)_2^+ + 3OH^- \rightarrow Al(OH)_3 + 2NO_3^-$ occurring at the electrode; and $Al(OH)_3$ is the solid partial nano-supported catalyst that is forming at the electrode.

2. Dry the borosilicate glass with the copper metal pattern with the partially formed nano-supported catalyst with a fifteen (15) minute bake at eighty degrees Celsius (80°C).

3. Immerse the borosilicate glass with the copper metal pattern with the partially formed nano-supported catalyst into a solution of $1 \times 10^{-3}$ $Fe(NO_3)_3 \cdot 9H_2O$ M (iron(III)nitrate hydrate) in IPA and apply a negative five

UTILITY PATENT
CR00-037 volt (-5V) bias to the copper metal pattern while keeping a counter electrode at ground for a duration of about one (1) minute. The desired chemical reactions involved in this step are:

$Fe(NO_3)_3 \rightarrow Fe(NO_3)_2^+ + NO_3^-$ occurring in solution;

$Fe(NO_3)^+ + 3OH^- \rightarrow Fe(OH)_3 + 2NO_3^-$ and $Fe(NO_3)^{+2} + 3OH^- \rightarrow Fe(OH)_3 + NO_3^-$ occurring at the electrode; and $Fe(OH)_3$ is the solid partial nano-supported catalyst that is forming at the electrode.

Figure 4:
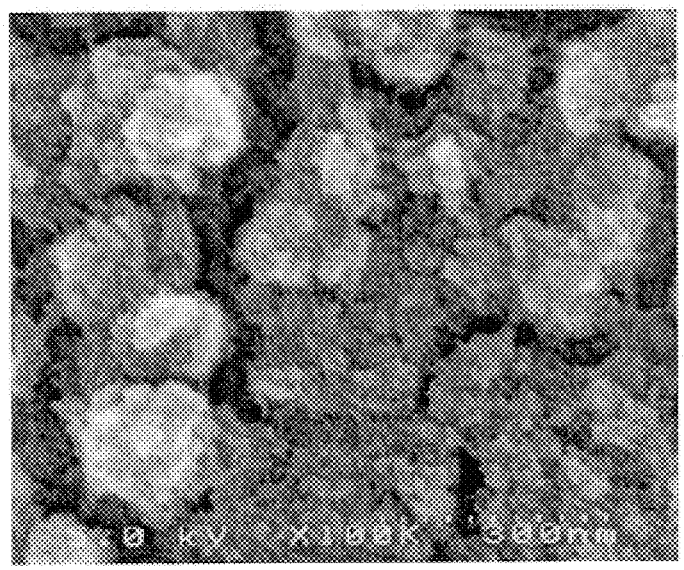
FIG. 4 is an illustration of a nano-supported catalyst prior to hot filament chemical vapor deposition that is formed with the method set forth in Example 1 of Appendix 1.

4. Dry the borosilicate glass with the copper metal pattern having the nano-supported catalyst formed of $Al_2O_3/FeO_x$ with a fifteen (15) minute bake at eighty degrees Celsius (80°C). (See FIG. 4 for an illustration of the nano-supported catalyst.)

5. Perform hot filament chemical vapor deposition (HFCVD) growth at five hundred and eighty degrees Celsius (580°C) with rhenium filament, and a gas mixture of methane ($CH_4$) and hydrogen ($H_2$) at a four to one ratio for thirty (30) minutes.

Figure 5:
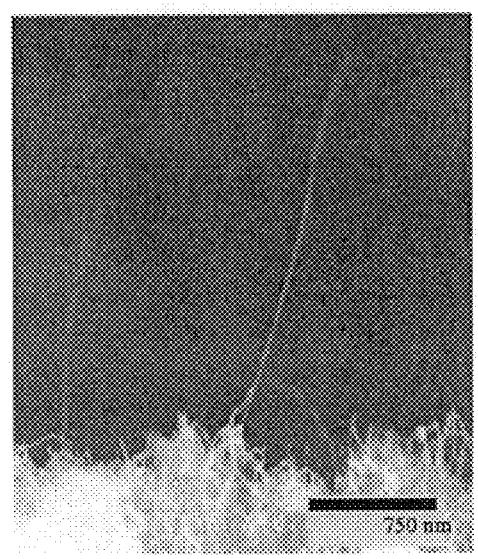
FIG. 5 is an illustration of carbon nanotubes that have grown on the surface of the nano-supported catalyst shown in FIG. 4 after hot filament chemical vapor deposition.

6. The resulting carbon nanotube film can be best described as a tangled carpet of carbon nanotubes with diameters on the order of about one nanometer (1 nm) to about three nanometers (3 nm) and an aspect ratio of ranging from one thousand (1,000) to 2,000). (See FIG. 5 for an illustration of the nanotubes.)

EXAMPLE II

1. Immerse a borosilicate glass with a copper (Cu) metal pattern (substrate with an electrode) into a solution with $1 \times 10^{-2}$M $Mg(NO_3)_2$ in isopropyl alcohol (IPA) and apply negative twenty volts (-20V) to the copper metal pattern while keeping a counter electrode, which can be constructed out of stainless steel, at ground for a duration of one (1) minute. The desired chemical reactions involved in this step are:

$Mg(NO_3)_2 \rightarrow Mg(NO_3)^+ + NO_3^-$ occurring in the solution;

$Mg(NO_3)^+ + 2OH^- \rightarrow Mg(OH)_2 + NO_3^-$ occurring at the electrode; and $Mg(OH)_2$ is the solid partial nano-supported catalyst that is forming at the electrode.

2. Dry the borosilicate glass with the copper metal pattern having the partially formed nano-supported catalyst with a fifteen (15) minute bake at eighty degrees Celsius (80°C).

3. Immerse the borosilicate glass with the copper metal pattern having the partially formed nano-supported catalyst into a solution of $1 \times 10^{-3}$ $Fe(NO_3)_3 \cdot 9H_2O$ M (iron(III)nitrate hydrate) in IPA and apply a negative five volt (-5V) bias to the copper metal pattern while keeping a counter electrode at ground for a duration of one (1) minute. The desired chemical reactions involved in this step are:

$Fe(NO_3)_3 \rightarrow Fe(NO_3)_2^+ + NO_3^-$ occurring in solution;

$Fe(NO_3)^+ + 3OH^- \rightarrow Fe(OH)_3 + 2NO_3^-$ and $Fe(NO_3)^{+2} + 3OH^- \rightarrow Fe(OH)_3 + NO_3^-$ occurring at the electrode; and $Fe(OH)_3$ is the solid partial nano-supported catalyst that is forming at the electrode.

4. Dry the borosilicate glass with the copper metal pattern with the formed nano-supported catalyst of $Mg_2O_2/FeO_x$ with a fifteen (15) minute bake at eighty degrees Celsius (80°C).

5. Perform hot filament chemical vapor deposition (HFCVD) growth at six hundred degrees Celsius (600°C) with rhenium filament, and a gas mixture of methane ($CH_4$) and hydrogen ($H_2$) at a four to one ratio for thirty (30) minutes.

EXAMPLE III

1. Immerse a borosilicate glass with a copper metal pattern (substrate with an electrode) into a solution with $1 \times 10^{-2}$M $Al(NO_3)_3$ plus $1 \times 10^{-3}$ $Fe(NO_3)_3 \cdot 9H_2O$ M in isopropyl

UTILITY PAT
CR00-037 alcohol (IPA) and apply a negative ten volt (-10V) bias to the copper metal pattern while keeping a counter electrode, which can be constructed out of stainless steel, at ground for a duration of one (1) minute. The desired chemical reactions involved in this step are:

$Al(NO_3)_3 \rightarrow Al(NO_3)^{2+} + NO_3^-$ and $Fe(NO_3)_3 \rightarrow Fe(NO_3)_2^+ + NO_3^-$ occurring in the solution;

$Al(NO_3)_2^+ + 3OH^- \rightarrow Al(OH)_3 + 2NO_3^-$, $Fe(NO_3)^+ + 3OH^- \rightarrow Fe(OH)_3 + 2NO_3^-$ and $Fe(NO_3)^{+2} + 3OH^- \rightarrow Fe(OH)_3 + NO_3^-$ occurring at the electrode; and $Al(OH)_3$ and $Fe(OH)_3$ are the solid nano-supported catalyst that is forming at the electrode.

2. Dry the borosilicate glass with the copper metal pattern with the formed nano-supported catalyst of $Al_2O_3/FeO_x$ with a fifteen (15) minute bake at eighty degrees Celsius (80°C).

3. Perform hot filament chemical vapor deposition (HFCVD) growth at six hundred degrees Celsius (600°C) with rhenium filament, and a gas mixture of methane ($CH_4$) and hydrogen ($H_2$) at a four to one ratio for thirty (30) minutes.

What is claimed is:

1. A method of forming a nano-supported catalyst on a substrate, said method comprising the steps of:

configuring a substrate with an electrode;

immersing said substrate with said electrode into a solvent containing a first metal salt and a second metal salt, wherein said first metal salt and said second metal are soluble in said solvent; and applying a bias voltage to said electrode such that a nano-supported catalyst is at least partly formed from said first metal salt and said second metal salt on said substrate at said electrode, wherein said nano-supported catalyst has an active catalytic particle with at least one dimension that is greater than one tenth of a nanometer and less than about five hundred nanometers; and removing oxygen from said active catalytic particle contained in said nano-supported catalyst.

2. The method of claim 1, wherein said active catalytic particle is derived from said second metal salt and selected from the group consisting of iron, nickel, cobalt, ruthenium, rhodium, palladium, rhenium, osmium, iridium, platinum, and a combination thereof.

3. The method of claim 1, wherein said active catalytic particle is comprised of a metal oxide support that is derived from said first metal salt and selected from the group consisting of alumina, magnesium oxide, calcium oxide, and a combination thereof.

4. A method of forming a nano-supported catalyst on a substrate, comprising:

configuring a substrate with an electrode;

immersing said substrate with said electrode into a first solvent containing a first metal salt, wherein said first metal salt is soluble in said first solvent;

applying a first bias voltage to said electrode such that a nano-supported catalyst is at least partly formed from said first metal salt on said substrate at said electrode;

removing said substrate from said first solvent containing said first metal salt;

immersing said substrate with said electrode into a second solvent containing a second metal salt, wherein said second metal salt is soluble in said second solvent; and applying a second bias voltage to said electrode in said solvent such that said nano-supported catalyst is partly formed from said second metal salt on said first electrode, wherein said nano-supported catalyst has an active catalytic particle that has at least one dimension greater than about one tenth of a nanometer and less than about five hundred nanometers.

5. The method of claim 4, wherein said active catalytic particle is derived from said second metal salt and selected from the group consisting of iron, nickel, cobalt, ruthenium, rhodium, palladium, rhenium, osmium, iridium, platinum, and a combination thereof.

6. The method of claim 4, wherein said active catalytic particle is comprised of a metal oxide support that is derived from said first metal salt and selected from the group consisting of alumina, magnesium oxide, calcium oxide, and a combination thereof.

7. The method of claim 4, further comprising removing oxygen from said active catalytic particle contained in said nano-supported catalyst.

8. A method of forming at least one nanotube on a substrate, said method comprising the steps of:

configuring a substrate with an electrode;

immersing said substrate with said electrode into a solvent containing a first metal salt and a second metal salt, wherein said first metal salt and said second metal are soluble in said solvent;

applying a bias voltage to said electrode such that a nano-supported catalyst is at least partly formed from said first metal salt and said second metal salt on said substrate at said electrode;

conducting a chemical reaction process to grow at least one nanotube on said nano-supported catalyst formed at least in part from said first metal salt and said second metal salt, wherein said nano-supported catalyst has an active catalytic particle; and removing oxygen from said active catalytic particle contained in said nano-supported catalyst.

9. The method of claim 8, where said chemical reaction process is selected from the group consisting of catalytic decomposition, pyrolysis, chemical vapor deposition, and Hot Filament Chemical Vapor Deposition (HTCVD).

10. The method of claim 8, wherein said active catalytic particle has at least one dimension greater than about one tenth of a nanometer and less than about five hundred nanometers.

11. The method of claim 9, wherein said nano-supported catalyst is derived from said second metal and selected from the group consisting of iron, nickel, cobalt, ruthenium, rhodium, palladium, rhenium, osmium, iridium, platinum, and a combination thereof.

12. The method of claim 11, wherein said at least one dimension is less than about ten nanometers.

13. The method of claim 10, wherein said at least one dimension is less than about three nanometers.

14. The method of claim 13, wherein said at least one dimension is less than about one nanometer.

15. The method of claim 8, wherein said nano-supported catalyst has a metal oxide support derived from said first metal salt and selected from the group consisting of alumina, magnesium oxide, calcium oxide, and a combination thereof.

16. The method of claim 8, wherein said solvent is selected from the group consisting of water and alcohol and a combination thereof.

17. The method of claim 8, wherein said chemical reaction process is conducted at a nanotube growth temperature that is less than about six hundreds and fifty degrees Celsius.

18. The method of claim 8, wherein said chemical reaction process is conducted at a nanotube growth temperature that is less than about six hundreds degrees Celsius and greater than about five hundred degrees Celsius.

19. The method of claim 8, said substrate is selected from the group comprising borosilicate glass and sodalime glass.

* * * * *